(12) United States Patent
Yao et al.

(10) Patent No.: US 8,065,041 B2
(45) Date of Patent: Nov. 22, 2011

(54) CONCENTRATING CONTROL METHOD OF GENERATING SETS FOR GRID ENERGY SAVING AND REDUCTION OF SO$_2$ DISCHARGE

(75) Inventors: Jiangang Yao, Changsha (CN); Shan Ouyang, Changsha (CN)

(73) Assignees: Yongxi Ouyang, Changsha (CN); Shan Ouyang, Changsha (CN); Liang Ge, Changsha (CN)

( * ) Notice: Subject to any disclaimer, the term of this patent is extended or adjusted under 35 U.S.C. 154(b) by 130 days.

(21) Appl. No.: 12/475,533

(22) Filed: May 31, 2009

(65) Prior Publication Data

US 2009/0240378 A1   Sep. 24, 2009

Related U.S. Application Data

(63) Continuation of application No. PCT/CN2007/001317, filed on Apr. 20, 2007.

(30) Foreign Application Priority Data

Nov. 30, 2006  (CN) .......................... 2006 1 0136775

(51) Int. Cl.
  *G05D 3/12* (2006.01)
  *G05D 5/00* (2006.01)
  *G05D 9/00* (2006.01)
  *G05D 11/00* (2006.01)
  *G05D 17/00* (2006.01)

(52) U.S. Cl. ......... 700/286; 700/287; 700/291; 700/295

(58) Field of Classification Search .......... 700/286–287, 700/291, 295, 297; 705/10, 14.11, 36 R, 705/37, 140.11
See application file for complete search history.

(56) References Cited

U.S. PATENT DOCUMENTS

| | | | | |
|---|---|---|---|---|
| 6,067,549 A * | 5/2000 | Smalley et al. | ........................ | 1/1 |
| 6,112,188 A * | 8/2000 | Hartnett | ........................ | 705/36 R |
| 6,115,672 A * | 9/2000 | Caveny et al. | ........................ | 702/19 |
| 6,256,640 B1 * | 7/2001 | Smalley et al. | ........................ | 1/1 |
| 7,039,575 B2 * | 5/2006 | Juneau | ........................ | 703/18 |
| 7,117,046 B2 * | 10/2006 | Boyden et al. | ........................ | 700/52 |
| 7,343,341 B2 * | 3/2008 | Sandor et al. | ........................ | 705/37 |
| 7,396,514 B2 * | 7/2008 | Hammel | ........................ | 422/168 |
| 7,536,232 B2 * | 5/2009 | Boyden et al. | ........................ | 700/52 |
| 7,599,750 B2 * | 10/2009 | Piche | ........................ | 700/36 |
| 2004/0015271 A1 * | 1/2004 | Juneau | ........................ | 700/286 |

* cited by examiner

*Primary Examiner* — Ramesh Patel
(74) *Attorney, Agent, or Firm* — Matthias Scholl P.C.; Matthias Scholl (57) ABSTRACT

The present invention provides a control method for generating data sets for reduction of sulfur dioxide discharge in energy grid. The electric price parameters, energy-consumption parameters, and SO$_2$ discharge parameters of the generating sets are collected and processed, and the final generating sets are selected according to different control goals or the comprehensive analysis of the electric price parameters, the energy-consuming parameters and the SO$_2$ discharge parameters of the generating sets. The present invention sets the least SO$_2$ discharge in general power grids as a target and solves the problem of the present loss of control of SO$_2$ discharge in the generating sets.

7 Claims, 3 Drawing Sheets

CONCENTRATING CONTROL METHOD OF GENERATING SETS FOR GRID ENERGY SAVING AND REDUCTION OF SO₂ DISCHARGE

CROSS-REFERENCE TO RELATED APPLICATIONS

This application is a continuation of International Patent Application No. PCT/CN2007/001317, with an international filing date of Apr. 20, 2007, designating the United States, now pending, and further claims priority benefits to Chinese Patent Application No. 200610136775.7, filed Nov. 30, 2006. The contents of all of the aforementioned applications, including any intervening amendments thereto, are incorporated herein by reference.

BACKGROUND OF THE INVENTION

1. Field of the Invention

The invention relates to a dynamoelectric method, and more particularly, to a concentrating control method of generating sets for a grid energy saving and reduction of $SO_2$ discharge.

2. Description of the Related Art

The modern power system is a very large, vast, and complicated system; any local faults will probably cause large-area blackouts.

To maintain safety, stability, and economic operation of a large system that relates to social welfare, and the synchronous development of power systems in the grid control center, and the end of power plants, a homologous information and control system needs to be set up.

This type of system is being called "Energy Management System" (EMS). The grid control center manages and controls real-time balancing of the entire electric power system such as generation, transmission, distribution, and is supplemented by EMS.

The traditional generating set operational controlling methods based on power generating plan targets or energy-consuming indicators have evolved into methods that control the power generating set by the "sell electric price" (bid) from low to high in the control center throughout domestic and international power grids. In other words, grid control centers set the lowest cost for the purchase of electricity as a target to control the generating set. In order to adapt to changes in the power system, many grids build a separate technical support system (or grid operator control system) to adapt to the electricity market operation, on the basis of the EMS or outside the EMS, for the processing of "sold electricity" (electricity to access grid), electric price of generating set, and the corresponding control signals. Then, the EMS controls the operation of the generating set under the control commands of a grid operator control system.

Therefore, the power grid operator control system and EMS relationship between foreground and background is functional; the power grid operator control system processes the balance of power supply and demand. The grid control center uses EMS for power generation systems with real-time control under the former set of the bid and control signal of the generating set.

For the above-mentioned reasons; the world's grid control centers, to achieve market-oriented reform, adopt bidding for generating sets as the control variable to conduct real-time control on the grid generating set by EMS. Power generation enterprises must use various technical means (of which the widest used is an automatic generation control system—the main station of the plant's AGC terminal station, PLC devices, or plant stations' AGC) to control the respective set and achieve the optimizing of the allocation of resources in a single or a generating set, thus seeking to maximize economic efficiency.

In addition, both in abroad and domestic power grids, primary energy consumption of generating sets is a variable, but in many cases, coal as the representative of fossil fuel is the primary energy source. With more and more consumption of electricity in human society, coal-power generation has increased significantly. Air discharge from coal-fired power plant's flue gas such as $SO_2$ (sulfur dioxide) and other harmful gases also will increase substantially, seriously affecting the survival of the human environment. All countries in the world are trying to reduce the total $SO_2$ discharge in the atmosphere. With human demand for electricity growing at the same time, we need to reduce environmental pollution. For the coal-fired power plants, $SO_2$ discharge must be reduced as much as possible.

For a single power generating set, due to restrictions on the design of fuel electricity output in certain circumstances, $SO_2$ discharge within smoke is basically not controllable in addition to installation of desulphurization facilities. However, types of the primary energy and characteristics of $SO_2$ discharge are not the same between different sets, and sometimes are very different. For example, for the thermal generating single set capacity of 600 MW, the output of one kilowatt of electricity consumption goes along with about 300 grams of standard coal, and for a thermal generating set with single set capacity of 50 MW, the standard coal consumption per kilowatt-hour calls for more than 450 grams, which means that in the premise of the same generating capacity and coal quality, $SO_2$ discharge of the latter is larger than the former by 50 percent. The $SO_2$ discharge of the same set in full-loads and low-loads are very different; hydropower and wind power generation has no $SO_2$ discharge.

Therefore, to set the least $SO_2$ discharge of the overall power grid as the goal is of very real social and economic significance to optimize control of the entire power grid generating set.

SUMMARY OF THE INVENTION

In view of the above-described problems, it is an objective of the invention to provide a concentrating control method of generating sets for a grid energy saving and reduction of $SO_2$ discharge, which includes the following major steps:

1) Inputting electric price parameters, energy-consuming parameters, and $SO_2$ discharge parameters of each generating set into the grid control center through a communication network such as Internet, telephone channel, radiotelephone, carrier wave, or microwave.

2) After receiving the above informations, the grid control center first identifies, confirms, and saves the received information into the database, then this data is classified and sorted according to disposal, sorting arithmetic and the control cycle, the electric price parameter, energy-consuming parameter, and $SO_2$ discharge parameter of each generating set are outputted separately from small to large.

3) According to the grid load requirement, and the need to follow the principle of balancing demand and supply, the power grid center confirms the generating set selected according to the sorting data of the energy-consuming parameters and the $SO_2$ discharge parameters; the grid control center searches the generating sets one-by-one according to energy-consuming parameters, and the energy-consuming parameter of the last generating set is the energy-consuming stake line when the total output of the generating sets is equal to the power grid load. The grid control center searches each generating set one-by-one according to $SO_2$ discharge parameters, and the $SO_2$ discharge parameter of the last generating set is the $SO_2$ discharge stake line when the total output of the generating sets is equal to the power grid load. Then, it is compared to the energy-consuming stake line with energy-consuming parameters; information of generating sets is selected and is outputted. According to the grid load requirement, the grid control center outputs information of the generating set selected with electric price. This information is inputted into the electric price and energy-consuming preselection computer, and carries out the preselection calculation, and outputs data of the generating set selected with energy-consumption. The grid control center outputs the economic considerations data of energy-consuming replacement of the generating sets according to the energy-consuming stake line.

Figure 4:
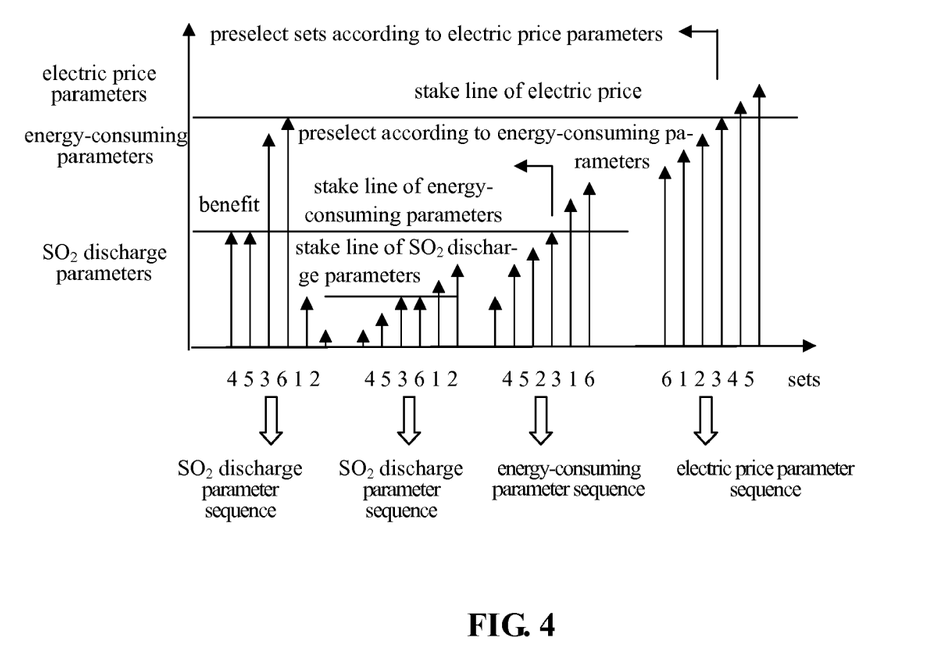
FIG. 4 is a diagram of electric price parameters, energy-consuming parameters, and $SO_2$ discharge parameters of each generating set sorted and selected in the implementation of this invention.

The energy-consuming stake line and the $SO_2$ discharge stake line are intuitionisticly defined. The so-called stake line is the abbreviation for the horizontal stake line parameter. FIG. 4 shows that all the sets where the parameter is big than the homologous stake line can not be selected.

4) According to the data of the preselected generating set with energy-consumption, the grid control center regulates the data base on the comparison of economic techniques and confirms the generating set selected; or the grid control center comprehensivly analyzes the electric price, energy-consumption, and environmental protection to the data of the generating set selected with energy-consumption and the generating set selected with $SO_2$ discharge, and regulates the data base by comparing economic techniques, and confirms the generating set selected.

5) The grid control center can adopt a direct manual operation to control the generating set selected; or the automatic generation control system of the grid control center outputs control signals of the generating set selected to the automatic generation control system of each generation company through a private data network of power grids, and realizes automatic generation control to the generating set.

The automatic generation control system of generation companies respectively control and link the controller of each generating set or the automatic generation control system of grid control center send out signals to the controller of each generating set through a private data network for the power grid, and the signal of the generating set controller is secondly assigned to an analog converter and converted to analog, then the analog is sent to a boiler-turbine coordinated control system, and the grid control center realizes automatic generation control to the generating set.

In the above technical programs, the above-mentioned energy-consuming parameter and $SO_2$ discharge parameter of each company's generation set is decided by physical and chemical properties of the fuel, running environment, and conditions of the set, and measured by chemical experiments and monitors. Financial compensation for the replacement of energy-consuming data is calculated according to power on, power off, and homologous fuel consumption.

Energy management system (EMS), AGC master station of the grid control center, AGC plant station, PLC of power plant, boiler-turbine coordinated system (DCS), and the network of communication and control in these systems can use current technology.

The technical effects of this invention are introduced as below. According to the load demand, electric price parameter, energy-consuming parameter, and $SO_2$ discharge parameter of each generating set, the method solves the problem of the present loss of control of $SO_2$ discharge in generating sets brought from the grid control center control generating set only in accordance with a power bid or generation scheduling. Also, the method could save energy and minimize $SO_2$ discharge from coal-fired set to reduce pressure on environmental protection. Social and economic efficiency is very significant. It is momentous technology for power system's energy saving, environmental protection, and sustainable development.

BRIEF DESCRIPTION OF THE DRAWINGS

A detailed description of accompanying drawings will be provided below.

DETAILED DESCRIPTION OF THE EMBODIMENTS

Detailed description will be given below in conjunction with accompanying drawings.

Figure 1:
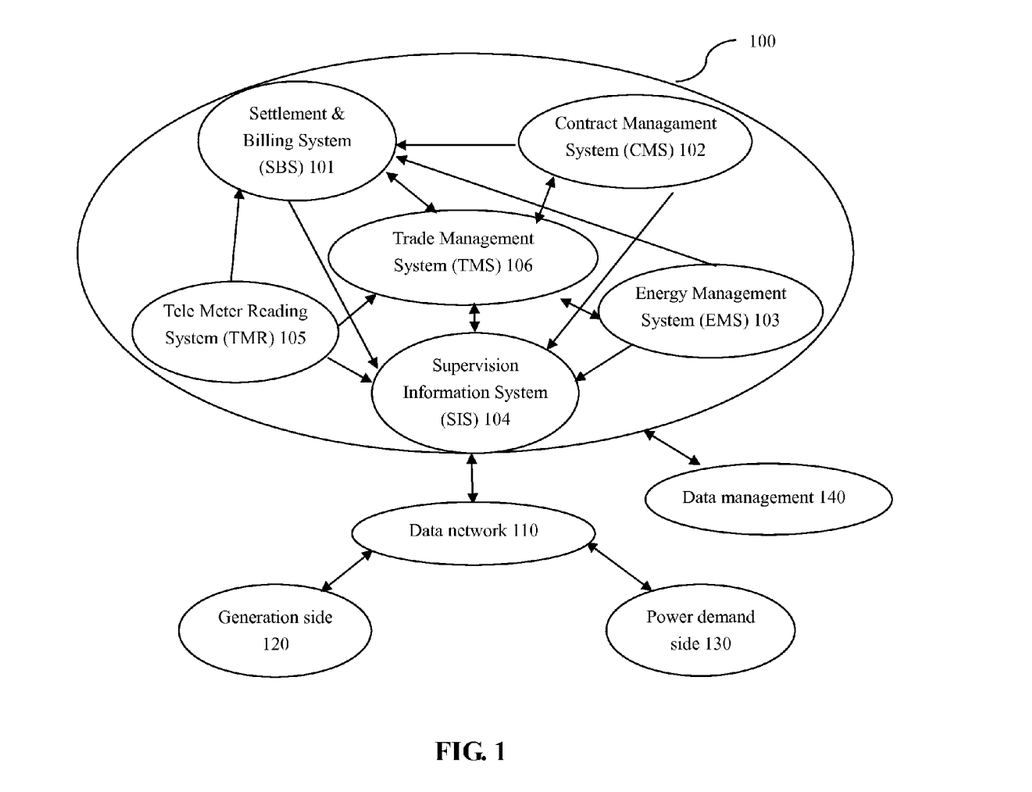
FIG. 1 shows logic relation and functions between several main modules of power grid operation and control systems in existing grid control centers, also shown is the information flow relation between the system and generation company.

FIG. 1 shows logic relation and functions between several main models of power grid operation and control systems in existing grid control centers, also shown is the information flow relation between the host station of the system and power generation enterprise. A power grid operation and control system generally comprises a host station 100, a Data network 110, Generation side 120, Power demand side 130 and Data management 140. The host station 100 comprises a Settlement & Billing System (SBS) 101, a Contract Management System (CMS) 102, an Energy Management System (EMS) 103, a Supervision Information System (SIS) 104, a Tele Meter Reading System (TMR) 105, and a Trade Management System (TMS) 106. The host station 100 connects with Data management 140, and it also connects with the Generation side 120 and Power demand side 130 through the Data network 110.

Figure 2:
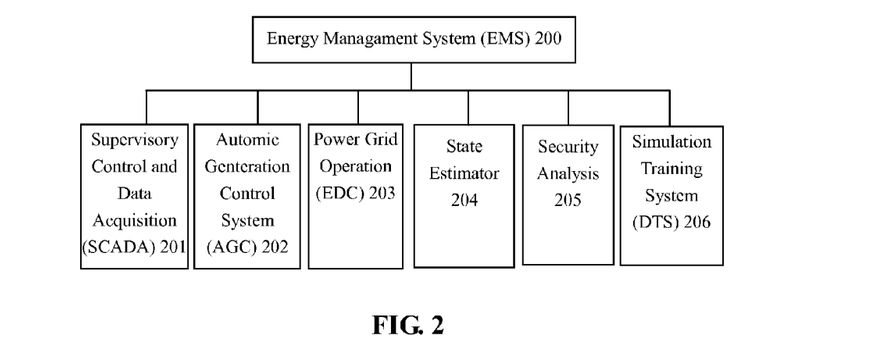
FIG. 2 is a structure schematic view of an existing energy management system (EMS) of a grid control center.

FIG. 2 shows the main models and correlations of an Energy Management System (EMS) in an existing grid control center. The Energy Management System (EMS) 200 comprises a Supervisory Control And Data Acquisition (SCADA) 201, a Automic Genteration Control System (AGC) 202, a Power Grid Operation (EDC) 203, a State Estimator 204, a Security Analysis 205, and a Simulation Training System (DTS) 206.

The Energy Management System (EMS) 200 consists of the hardware platform, operating system platform, supporting platform, the basic application, and the advanced application software of the power. These platforms can provide distributed application development and a running environment for the whole system. As a fast and reliable middleware between application system, bottom hardware system, and operating system, the upper-level application and bottom system are insulated effectively, and create an environment for operating platforms to run designs and upper-level application systems, provided there is a reliable safeguard and established foundation for a stable and fast system.

Distributed application development and running environment provide a virtual, unified, extensible and distributed development platform for upper-level applications, and changed the programmable system from single to manifold. With appearance of the development platform, development of EMS application software can bypass the concept of "first platform, development behind," used as independent software by industry and appears to the upper-level application; the development application only depends on a series of programming interfaces and services that provide distributed application development and running environment. The layered development system tries hard to improve efficiency and speed of application development, and adds unity and analyzability of application codes, openness, and maintainability of the application.

In this method, the subsystem makes grid control centers realize concentration and real-time control for the generating set as follows:

The Supervisory Control and Data Acquisition (SCADA) 201 is the supervisory control and data acquisition system, the basic EMS module that mainly completes data collection, processing, interpretation, storage, display, and transmits information to other application modules in real time. In this invention, SCADA system not only needs to collect and store the original set electric price data, but also build the database of energy-consuming parameters, $SO_2$ discharge parameters, and complete the corresponding interpretation, processing, storage, and display of this data, and send this real-time information to other application modules.

The Automic Gentenration Control System (AGC) 202, as a core function of the EMS, is included in the EMS system RTGEN (real-time power generation) applications of the EMS system. Different from the early energy management systems, the existing open energy management system AGC grid control center generally uses terminal graphical user interface (GUI) technology, which could achieve many functions of the power grid control using graphics; thus, it is more intuitive and convenient. Under normal circumstances, the operators of grid control centers need only to input or amend the relevant state data of the generating set control through the human-computer interface, and deal with the specialized application software which is designed to achieve these features in AGC, so that we can achieve the specified control objectives.

In AGC, the main module to achieve this method is the basic value power-tracking module, the module's main function is, based on generating demand for its power plants under the control of the controller, to provide power-value, which means controlling officers in power grid AGC only need to work on the interface to input the control goal into the set (of power value and power mode). There are four types of power-based models: economic power grid economic dispatch control mode (Economic Dispatch, ED), plans settings mode (BL), average economic output mode (AV), and manual input method (BP). They can be used to achieve this by way of Requirements of the control objectives. ED is the way that control officers enter a process of economic operation into the AGC; the procedures set the economic output of relevant sets, thereby to give the power-control set a value automatically, the reference value. BL refers to the way the set is a planned (scheduled) effort; AV the base set of the average economic output value, which distributes the capacity of the average percentage among sets involved. BP staff from the power grid control settings manually. These methods can all achieve this invention. However, it is clear that BP (artificial) and BL (plan) means are the most intuitive.

The regulation module of a generating set and the master station of AGC (automatic generation control system of grid control center) are inseparable. The module's main function is to adjust the current output value assigned to generator controller (PLC) which is controlled by AGC master station.

PLC interface with the electrical circuit is completed through some input and output (I/O). I/O module integrates the PLC I/O circuit, the input registers reflect the state of the input signal, and output reflects the state of the output latch. The input module transforms electric signals into digital signals to enter the PLC system, contrary to the output module. I/O includes digital input (DI), digital output (DO), analog input (AI), analog output (AO), and other modules.

PLC could communicate with the network; it enables the PLC, top computers, and other smart devices to exchange information to become unified to organize the scattered centralized control. Most PLCs have RS-232 interfaces, and some even have built-in interfaces that support their respective communications protocol. PLC communications now actualize mainly through multi-point interface (MPI) data communications, PROFIBUS, or industrial Ethernet.

AGC's Internal Working Methods:

The network control center works with the power plant to achieve control of AGC. When regulating output at the power plant is required, the power grid control center sends the AGC command to the remote monitoring system for information processing and communication devices; information processing and communications devices of monitoring system will confirm the nature, order, and object after receiving and returning the implementation of the signal to the higher level AGC from the remote control device. When the network control center receives the returned information, it then issues orders for the AGC. The main course (to set the AGC control of 600 MW sets as an example which uses D20/D200 remote terminal products of the United States GE Harris Energy Control Systems GmbH series) is as follows:

(1) The D200 main CPU board of information processing and communication devices receives remote control orders for implementation, and then after information processing, it will send specific adjusting AGC instructions (numerical) to the CPU motherboard D20C plate by which the D20C order is implemented.

(2) The D20C board will convert the AGC order into the corresponding 0-100 percent effort code of the 600 MW set. 4-20 mA is converted into 6553-32767 (AO of D20C card output resolution has 12+1 Symbol-bit) and transferred to the remote control output board of D20 AGC.

(3) The D20 AGC control 4-20 mA output to the DC analog output value to coordinate the boiler system (DCS), to control the main valve of turbine, and coordinate the oil linked with the boiler (pulverized coal) to regulate generator effort.

(4) The GR90 AGC board can control the output to 8 bipolar voltage/unipolar current remote-output; the D20 AGC controlling input board will return the regulated condition to power plants and power grids control center systems to monitor the module D20 AGC Output state.

AGC Control Manner:

The AGC control system has the following three work functions:

(1) Control Manner 1 (Direct Remote Control)

The grid control center delivers the single output value of AGC orders. Information processing and communication device D200 receives the AGC order, and outputs an analog signal to the boiler set coordination system (DCS) through D20C panels in the control of the D20 AGC input/output panel, thus realizing the control of set output.

(2) Control Manner 2 (Local Automatic Mode 1):

The grid control center assigns the total output value to power plants and power plants SCADA computer monitoring systems after receiving AGC orders from the grid control center, according to the actual operating conditions of the various sets to redistribute set load. The AGC order will then be transferred to information processing and communication device D200. An analog signal is sent to the coordination set of the boiler system through D20C panels in the control of the D20 AGC output/output panel, thus realizing the control of set.

(3) Control Manner 3 (Local Automatic Mode 2):

The grid control center issues a generating schedule for the power plant (automatic or manual input). After receiving data from the power plant's SCADA computer monitoring system, the process and set becomes a fixed output value for various sets according to their actual operating conditions. AGC order will then be transferred to information processing and communication devices D200. An analog signal is sent to the coordination set of the boiler system through D20C panels that control the D20 AGC output/output panel, thus realizing the automatic control for the set, which makes the overall output inosculate the generating schedules of power grid control center (function of tracking power generation schedules).

To Receive AGC Order

According to the three control modes, receiving AGC orders are as follows:

(1) Information processing and communication D200 devices receive the single output value of AGC orders issued by the grid control center, and output a DC analog signal to the coordination system (DCS) of the boiler set through the D20 AGC control output/output panel of D20C combined panels.

(2) Based on the orders from the grid control center, the SCADA system sends the plant the total output value. Using man-machine dialogue, the generation stand-alone value of a single set or the total plant is input manually. An AGC order is then sent to information processing and communication D200 devices. After, DC analog signals are sent to the coordination system (DCS) of the boiler set through the D20 AGC control output/output panel of D20C combined panels.

(3) The grid control center delivers a generating curve to SCADA systems of the entire power generation plant. The SCADA systems then transfer the AGC order to information processing and communication D200 devices, where digital signals are transferred into DC analog signals and sent to the coordination system (DCS) of the boiler set through the D20 AGC control output/output panel of D20C combined panels.

In conclusion, the EMS system of modern grid control centers has achieved intelligent, integrated, complex system control using full use of computer technology. Functions can be achieved with simple man-machine dialogue in the human-computer interface of EMS, no run, and control personnel are needed for real-time programming operation.

Therefore, there are natural conditions of the project technology to implement real-time centralized control of generating sets with this method while the grid control center just needs to make full use of the present grid operation and control system and EMS platform.

Figure 3:
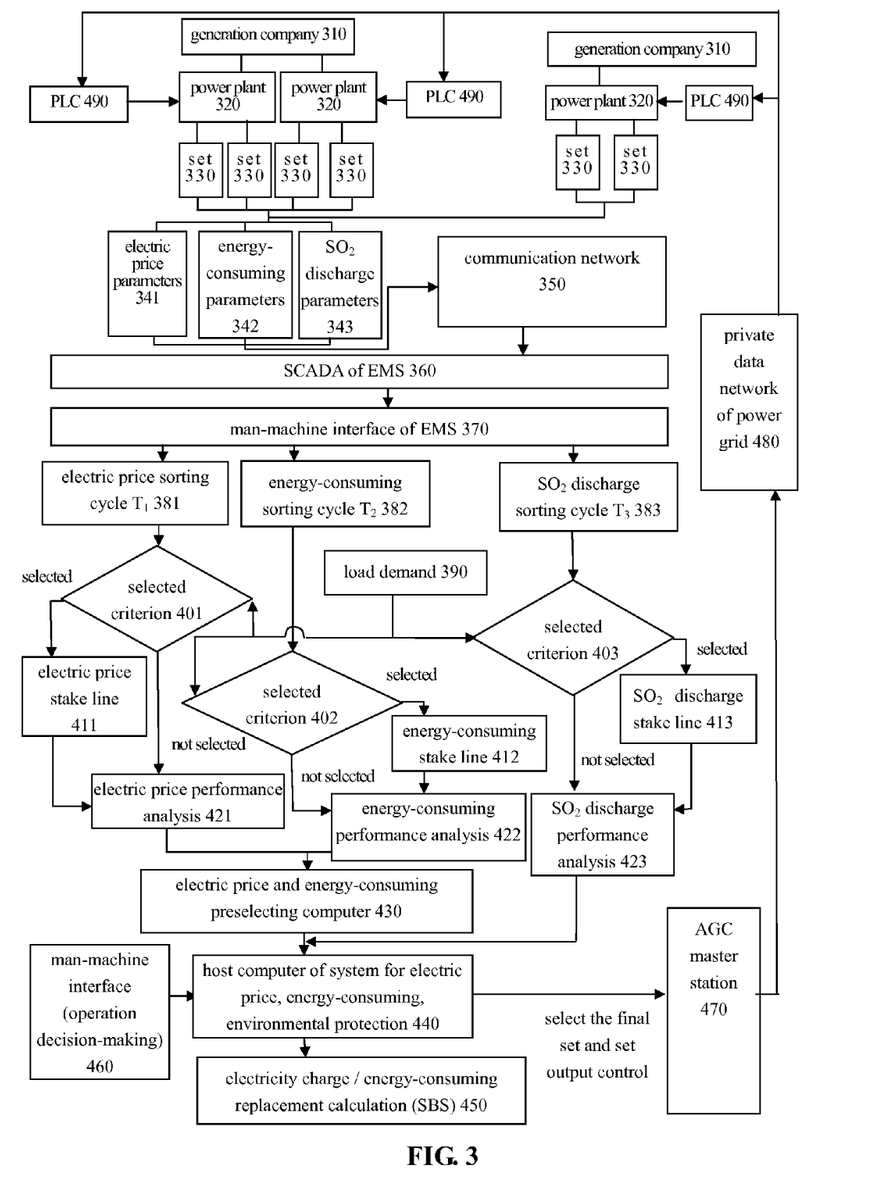
FIG. 3 is a flow diagram of all relevant systems that control the process of this invention.

FIG. 3 marks in detail the process controlling systems and related processes of the invention, marks the whole process of raw data and information collection, processes, exports and implements, and displays logic relations of the technology solution as a whole. The implementation of all of the above will be described in detail.

FIG. 4 depicts the condition of electric price parameters, energy-consuming parameters, and $SO_2$ discharge parameters in accordance with different control variables that control the corresponding output and control nominated, and also marks the replacement effect of this invention to use low energy-consuming and low $SO_2$ discharge sets instead of high energy-consuming and high $SO_2$ discharge sets.

To illustrate the concrete implementation steps of this method, we simplify and do the following assumptions for power grids in a certain time (such as one hour): 1) all the generating sets have the same capacity in power grids. 2) It does not consider the power grid loss and network congestion, and also does not consider frequency modulation and voltage modulation. 3) Power grids have in all six generating sets, four of them running on time is enough to meet the market balance of supply and demand. 4) Set No. 4 is a hydropower generating set, which has simply no $SO_2$ discharge, or to say its $SO_2$ discharge parameter is 0.5) It does not consider the intercommunication with the outside power grid.

Refer to FIG. 3, implementation steps of this method are as follows:

1) Electric price parameters 341, energy-consuming parameters 342, and $SO_2$ discharge parameters 343, of each generating set (i.e., set 330 in FIG. 3) are inputted into the grid control center through a communication networks 350 such as Internet, telephone or radiotelephone, carriers and microwaves, etc.

SCADA of EMS 360 of modern grid control centers carries out data collection and processing; SCADA uses database technology to store and process these data.

The grid control center collects electric price parameters 341, energy-consuming parameters 342, and $SO_2$ discharge parameters 343 of each generating set through communication networks such as Internet, telephone or radiotelephone, carriers and microwaves, etc. When the power grid is small, the number of sets is small and the cycle of control circumstances is long. The grid control center can adopt the simplest way to deal with electric price parameters, energy-consuming parameters 342, and $SO_2$ discharge parameters 343 to storage and handling by other means, using Excel tables and call related Excel functions to deal with these parameters to store, retrieve, and sorting processing.

From the standpoints of science and engineering technology, the generating set is virtually energy replacement machinery that obeys the law of electromagnetic induction and the law of conservation of energy, which can only converts chemical energy hidden in the fuel into heat energy through the boiler and other equipment; with water steam as the medium through the turbine and other equipment, heat energy will be converted into mechanical energy. In the end, the mechanical energy generators will be eventually converted into electricity. As we all know, in the process of power generation, chemical energy (such as coal, oil), potential energy (such as hydro, wind, etc.), and radioactivity (nuclear energy), are named as primary energy while electricity energy is typically considered secondary energy. There are big differences between $SO_2$ discharge and energy-consumption in the process of energy conversion. These are the reasons for using different primary energy, different technical performance of generating sets, different operation environments and operation conditions etc. $SO_2$ discharge parameters 343 and energy-consuming parameters 342 are the concentrated expression and the measurable description of the above factors, and are the key technical parameters to achieve the objectives of the methods described.

$SO_2$ discharge and energy-consuming parameters of generating sets must be detected by means of experiments and tracked with continuous operation. It is an important technical foundation work in the power generation industry for enterprises to experiment and measure $SO_2$ discharge parameters 343 and energy-consuming parameters 342 with the help of professional power organizations and environmental monitoring bodies while examining and repairing sets.

In practice, energy-consuming parameters 342 and $SO_2$ discharge parameters 343 depend on the grade of fuel, and fuel grade, to a large extent, depends on the origin and the batch of fuel to the plant, therefore, power enterprises have professional laboratories, equipped with professional staff and facilities for each batch of fuel delivered to the plant, according to the spotted regulations of coal-firing sampling to detect heat, water, ash, volatile compounds, sulphur, iron, and other chemical elements among them. Since energy consumption parameters of this method are used as centralized control variables for the entire power grid, the specific operations differ from a single power plant fuel quality testing. The operational elements to be paid attention to are as follows: first, coal sampling and quality testing differ from plan to plant. In method sampling, coal must be tested before it goes to the coal warehouse to ensure that sampling and testing raw coal are the same as ones into the furnace. Secondly, raw coal entering the warehouse must be measured and calculated by electronic balance of the coal deferent belt. Thirdly, the corresponding electricity computation points should be located in the electricity Internet gateway instead of dynamotor output, which means we should use the energy consumption parameters corresponding to Internet power. Fourthly, the grid control center should have unified, canonical acquisition procedures to collect all the energy consumption parameters to ensure that this group of control variables are comparable.

For smoke detection of each set, it is generally the plant assay institutions, according to the rules of periodic sampling tests, that take quantitative analysis of the carbon content in fly ash to get the boiler combustion efficiency; that detect floaters in the soot to analyze the operational conditions of dust-removal facilities that test $SO_2$ and other harmful substances in the flue gas to test the operating efficiency of the desulfurization sets.

The detection, as the indispensable daily work of generating enterprises, can be complemented by environmental institutions, power generation enterprises, and the provincial electricity institutions technically, $SO_2$ discharge parameters 343 in particular. With the development of our society, people begin to identify with building an environment-friendly society and the development of green GDP, environmental protection agencies at all levels have strengthened the flue gas discharge testing, monitoring intensity, and strength of the power generation business. Many commercialized "Smoke discharge continuous monitoring systems" have provided technical means for scientific identification testing of $SO_2$ discharge parameters 343. This real-time monitoring system of direct measurements, which could not only supply fixed sources of gaseous contaminative discharge with perennial continuous monitoring, but also furnish the production process and the combustion process with a closed-loop control to reduce contaminative gas discharge, is key equipment for environmental supervision, evaluation, and management.

The system applies to coal-fired boilers for discharge monitoring, which offer continuous on-line monitoring of dust concentration, sulfur dioxide concentration, oxygen concentration, flue gas temperature, gas pressure, and the flue gas flow rate. The central control computer can dispose of and store measured data, and could be connected with computers in relevant departments through the network so that they can quickly recall monitoring data with convenience. As with the energy-consuming parameter, the $SO_2$ discharge parameter of the set testing must also be uniform and standardized over the entire power grid.

It is necessary, as well as technically feasible, to detect $SO_2$ discharge parameters 343 and energy-consuming parameters 342 every one to several hours, to conduct a test, and distribute them to the factory, grid control centers, and environmental protection agencies through IT technology. It is known that many large power enterprises are equipped with such facilities. It is only because today's grid control center sets the least power purchase cost as the control goal, that $SO_2$ discharge parameters 343 and energy-consuming parameters 342 of the power generation business are not sent through the automated technology platform to the power grid control center!

The sorting cycles of electric price parameters 341, energy-consuming parameters 342, and $SO_2$ discharge parameters 343 marked in FIG. 3 are named as electric price sorting cycle T1 381, energy-consuming sorting cycle T2 382, and $SO_2$ discharge sorting cycle T3 383, which means sampling sequencing among them can be carried out independently. The sampling-sorting cycle should be as short as possible if conditions permit. When the relevant factors do not change or change for a little, the parameters do not need frequent refresh.

Note the above-mentioned main operation points. We can guarantee $SO_2$ discharge parameters 343 and energy-consuming parameters 342 of the entire power grid to be standardized and scientific.

2) After receiving the above informations, the grid control center first identifies, confirms, and saves the received information into the database; then this data is classified and sorted according to disposal, sorting arithmetic and the sorting cycle determined on the man-machine interface of EMS 370, the electric price parameters 341, energy-consuming parameters 342, and $SO_2$ discharge parameters 343 of each generating set and outputted separately from small to large.

When energy is transported from the sets to a promissory location of the power grid, there will be a network loss (Line loss). Since all sets have different locations in the power grid, electricity will be transported to the promissory location with different distances. Therefore, the sets' electricity network loss coefficient will be different. This factor reflects the locations objectively of all power plants in the power grid geographically (electrical). It obeys "Ohm's law," and in the electricity industry, it is often referred to as the "line loss coefficient." Line loss coefficient reflects the electrical characteristics of the power grid topology, which is the basic technical data for power grids' operation. It is produced, stored, and managed by the grid control center SCADA (supervisory control and data acquisition). If the grid topology remains unchanged, "line loss coefficient" will not change.

To convert the bid of each set 330 into electric price parameters 341 in accordance with their respective counterparts of the "line loss coefficient," which means, to conclude and FIG. declared "sold electric price "of each set 330 as the respective electrical distance according to" Ohm's law," the algorithm is:

"Bidding" multiplied by (1+"line loss coefficient").

SCADA (supervisory control and data acquisition) in the grid control center uses the above method, in accordance with sets "quoted electric price" and its corresponding "line loss coefficient," to form electric price parameters 341.

The grid control center does the respective search, storage work of electric price parameters 341, energy-consuming parameters 342, and $SO_2$ discharge parameter 343 of the respective search, storage, and use of a sorting algorithm to deal with the following parameters, and sort the sets with the order from low to high. The corresponding serial numbers of the parameters are placed in the bottom of abscissa with Arabic numerals, as is shown in FIG. 4.

Obviously, there will be three different types of controls under the three different set of variables: control based on tariff parameters, $SO_2$ discharge parameters 343, and energy-consuming parameters 342. According to load demand, four generating sets among the six sets can be enough to realize the demand equilibrium. If we are to realize real-time electricity generation centralized control only in accordance with the electric price parameter, set No. 4 and set No. 5 will be in the ceased state. At this time, the cost for the grid control center to purchase electricity seems to be the lowest (China and other countries around the world use this control method at present). However, under this control manner, set No. 1 and set No. 6 with the highest energy consumption must be running. It is clear that the result is not the most economical one in the entire network; it is not the least energy-consuming. In addition, as can be found on the map, because set No. 1 and set No. 2 with the highest $SO_2$ discharge are listed, this method does not protect the environment. However, if we are to control the Internet only from the environmental objectives of the generating set, set No. 1 and set No. 2 will be in a ceased control state. To meet the demand for electricity, set No. 4 and set No. 5 must be in operation so that the cost will increase substantially; since set No. 2 is in a state of standing, what is more, set No. 6 must be in operation; energy-consuming will become maxed. FIG. 4 visually displays the technical problems that modern power system control centers face.

It specifically introduced the process to resolve the technical problems with this method.

3) According to the load demand 390 of the grid and the need to follow the principle of balancing demand and supply, the power grid center confirms the generating set selected according to the sorting data of the electric price parameters 341, energy-consuming parameters 342, and $SO_2$ discharge parameters 343; a selected criterion 401 is used to determine an electric price stake line 411: the grid control center searches the generating sets one-by-one according to electric price parameter. The electric price parameter of the last generating set is the electric price stake line 411 when the total output of the generating sets is equal to the power grid load; a selected criterion 402 is used to determine an energy-consuming stake line 412: the grid control center searches each generating set one-by-one according to energy-consuming parameters 342, and the energy-consuming parameter of the last generating set is the energy-consuming stake line 412 when the total output of the generating sets is equal to the power grid load. A selected criterion 403 is used to determine a $SO_2$ discharge stake line 413: the grid control center searches each generating set one-by-one according to $SO_2$ discharge parameters 343, and the $SO_2$ discharge parameter of the last generating set is the $SO_2$ discharge stake line 413 when the total output of the generating sets is equal to the power grid load. The grid control center separately compares the energy-consuming stake line 412 and electric price stake line 411 with energy-consuming sorting data and electric price sorting data; electric price performance analysis 421, energy-consuming performance analysis 422 and $SO_2$ discharge performance analysis 423 are done: the information of the generating set selected with energy-consuming and electric price are outputted. The information is inputted into the electric price and energy-consuming preselecting computer 430, and carries out the preselection calculation, and outputted data of generating set selected with energy-consuming. The grid control center outputs the economic considerations data of energy-consuming replacement of the generating sets according to the energy-consuming stake line 412.

The electric price stake line 411, energy-consuming stake line 412, and $SO_2$ discharge stake line 413 are intuitionisticly defined. The so-called stake line is the abbreviation for the horizontal stake line parameter. FIG. 4 shows that all the sets which parameter are bigger than the homologous stake line can not be selected; the electric price stake line 411 need not be defined when the grid control center confirms the generating set selected according to generation scheduling.

According to objective facts that energy-consumption follows the law of conservation of energy and $SO_2$ discharge parameter reflects the chemical composition of fuel and desulfurization efficiency of generating set, that stake lines use electric price parameters 341 and energy-consuming parameters 342 to determine a final operational generating set to effectively resolve the above-mentioned control technology problems of the generating set.

FIG. 4 marks the sets' control objectives and final control results very clearly. It is intuitive and clear to determine the revenue of the final selected set and energy-consuming volume of the set according to its $SO_2$ discharge parameters 343. The relationship between control objectives and control outcome is very clear.

4) According to the data from the preselected generating set of energy-consumption, the grid control center regulates the data base, comparing economic technique and confirming the generating set selected; or the grid control center comprehensive analyzes electric price, energy-consuming, and environmental protection to the data of the generating set selected with energy-consuming and the generating set selected with $SO_2$ discharge, and regulates the data base to compare economic technique and confirm the generating set selected. The electricity charge/energy-consuming replacement calculation (SBS) 450 is done.

The grid control center realizes man-machine conversation through the host computer of system for electric price, energy-consuming, environmental protection 440, determining the ultimate control command of the generating set under different control targets, such as the least total expenditure on purchasing power, or the least total energy-consuming of the grid, the least total $SO_2$ discharge of the grid, or integrated indicators compromised by the above indicators.

There may be need some timely adjustments on the basis of economic and technical comparison through human-computer interaction, because for some time, great economic costs have been paid during the process of a start or of decommissioning, or it takes too much economic and energy costs to lower the $SO_2$ discharge. Control personnel may need to make some appropriate and timely intervention of manual adjustments.

5) The grid control center can adopt direct manual operation to control the generating set selected. The automatic generation control system of the grid control center can output the control signal of the generating set selected to the automatic generation control system of each generation company 310 through a private data network of power grid 480, and realizes automatic generation control to the generating set.

Power systems are the largest comprehensive industrial network system. The grid control center is the institution to implement the network control of sets, which can use the manual or automated means to realize real-time control of the existing generating sets.

The grid control center makes generating sequences of the sets from low to high according to the set parameters, listed above respectively, to accord with control objectives. It then sets the operational status estate instructions under the power grid real-time load demand, and achieves remote control through the AGC and its terminal station plant PLC (power plant controller) over the grid, so as to ensure that all sets run in accordance with the operation sequence determined by the grid control center and to balance supply and demand of the power grid. Since this method creates the least $SO_2$ discharge in general power grids as targets and scientific properties of quantities relationships between $SO_2$ discharge and energy-consuming, this method uses the least total energy consumption over the grid as the basic link for the least $SO_2$ discharge.

FIG. 3 marks the linkage between AGC master station 470 of the grid control center and its plant terminal PLC 490, as well as transmission relations of control information.

EMS in modern grid control centers has achieved intelligent, integrated, and complex system control on the basis of full use of computer technology. Functions can be achieved through simple the man-machine dialogue using the man-machine interface of EMS; no run and control personnel are needed to get real-time programming operation.

Therefore, there are natural conditions of the project technology to implement real-time centralized control of generating sets with this method while the grid control center just needs to make full use of the present grid operation and control system and the EMS platform.

The Implementation Example:

A small power grid illustrates the practical application of the invention, energy-saving benefit to the power grid and the effect of $SO_2$ discharge/reduction.

To simplify the explanation process of the example, it is established that independent systems only have 6 sets, which are set No. 1, No. 2, No. 3, No. 4, No. 5, and No. 6. All the sets capacities are 300 MW and the investigation time was established at 1 hour. The energy bid (Yuan/Kwh), generation energy consumption (1 g standard coal per Kwh, g/Kwh for short), and $SO_2$ discharge (1 g $SO_2$ per Kwh, g/Kwh for short) of the sets in time quantum are shown in table 1. It is establishes that power grid load and related parameters in time quantum remain constant, and only need 4 sets with full load, and without considering power system loss ("the line loss coefficient" is zero, the bid is equal with the electric price parameter on the numerical value) and the network congestion, and using 500 Yuan/ton as the reductive-calculation coefficient of the energy-consumption and electric price parameter.

Analysis in Turn as Follows:

TABLE 1 the parameter of each set

| Set | Capacity (MW) | The electric price (Yuan/Kwh) | The energy-consuming (g/Kwh) | $SO_2$ discharge (g/Kwh) |
|---|---|---|---|---|
| 1 | 30 | 0.30 | 400 | 7.8 |
| 2 | 30 | 0.31 | 310 | 8.2 |
| 3 | 30 | 0.32 | 350 | 7.0 |
| 4 | 30 | 0.33 | 200 | 0 |
| 5 | 30 | 0.34 | 280 | 5.6 |
| 6 | 30 | 0.28 | 440 | 7.0 |

The original data of the generation enterprise sends to the grid control center through public communication channels or private network of the power grid such as the line, microwave and carrier waves.

For example, the grid control center accepts the above-mentioned data artificially, and adopts the Excel record and deposit, inspect, naturalization calculation, and disposes this data in order to come into being as parameters.

For example, under the condition that the quantity of set is few and time is more, we can make use of Excel to realize the collections, storage, processing, and sorting of bid, energy-consuming and $SO_2$ discharge parameters 343. Open procedures in Excel, build up an Excel form, name, and number set according to the time order of the set data, and sorts vertically. Thus, the first row list is the serial number, the second row list is the set name (contain the serial number of the power generation enterprise, power plant, inner-plant etc), the third row list is the offer, the fourth row list is the energy consumption parameter, the fifth row list is the $SO_2$ discharge parameter, the sixth row list is the set output, etc. data from all sets was collected and recorded in that table. When the set is sorted using a certain parameter, only use the mouse to click that row where the parameter is located, then pick out the ascending order (or ascending order) in the menu and click. Repeat the above-mentioned operation process to the different parameter in turn, complete the search of the set order under different control variables, and come into being homologous record. After making sure the whole power grid loads in a certain period, it is easy to confirm HLBP and selected set. It should point out that the electric price parameter is created after calculating the bid of the set electric quantity sold according to reductive-calculation coefficient. This process is completed with add a row in Excel form.

The parameters in table 1 calculate hourly generated energy, related resources consumption, and $SO_2$ discharge. See table 2.

TABLE 2

Hourly consumption comes from electric price, energy-consumption, and $SO_2$ discharge parameters

| Set | The generated energy (MW) | Pay fee (Yuan/ h) | The energy-consuming (ton/h) | The energy-consuming cost (Yuan/h) | $SO_2$ discharge (ton/h) |
|---|---|---|---|---|---|
| 1 | 30 | 90000 | 120 | 60000 | 2.34 |
| 2 | 30 | 93000 | 93 | 46500 | 2.46 |
| 3 | 30 | 96000 | 105 | 52500 | 2.1 |
| 4 | 30 | 99000 | 60 | 30000 | 0 |
| 5 | 30 | 102000 | 84 | 42000 | 1.68 |
| 6 | 30 | 84000 | 132 | 66000 | 2.1 |

It should be pointed out that the above table data has an actual and typical meaning Set No. 4 is the hydropower set, and its coal consumption data is calculated with the data of water status in that time (the actual data variety will not affect the qualitative of this example), resulting in a $SO_2$ discharge of 0. Other sets of energy-consumption difference are because of manufacturing characteristics, the usage material, etc. The difference in $SO_2$ discharge is the sulphur chemical element content of the coal (fuel), dissimilarity, and whether it was used to take off the sulphur establishment.

Generally, power plants sent out homologous data to grid control centers generated the previous day. The grid control center, in light of this method, carries on the classification, sorting, and computing to become respectively from low arrival to high parameter sequences. With this example, because there are only 6 sets, the entire artificial way of processing the control target that technical movement personnel of general medium class, is as good enough to competently verify (shown as FIG. 4).

For example, in the above-mentioned Excel form, pick out the electric price parameter first, and then click "ascending order" in the menu. A sequence of sets comes into being according to the electric price parameter from small to large. After sorting the electric price parameters 341, the energy-consuming parameters 342, and $SO_2$ discharge parameters 343 in turn, three sequences are created from small to large. The electric price parameter sequence: 6-1-2-3-4-5, the energy-consuming parameter sequence, 4-5-2-3-1-6, and the $SO_2$ discharge parameter sequence: 4-5-3-6-1-2 are shown in FIG. 4.

Obviously, according to the electric price parameter sequence and balance of generation and demand, when the power grid only needs 4 sets to generate, the selected sets are No. 6, No. 1, No. 2, and No. 3; however, under the same condition, the sets which have high energy-consumption exhaust high $SO_2$ discharge. This is determined by the chemical properties of the fuel. According to this regulation, in order to reduce the actual $SO_2$ discharge, preselected actual running sets are used from the energy-consumption sequence. Through searching and selecting artificially, the preselected sets are No. 4, No. 5, No. 2, and No. 3 (shown as FIG. 4).

In the process of the electric price—energy-consuming preselection, the system confirm the selected set of electric price and the selected set of energy-consuming according to HLBP, and creates financial compensation for the replacement of energy consumption data. When the set is not selected, it is not consumed as primary energy, and the displacement set needs to consume the primary energy in the actual running. Therefore, after comparing actual income of the selected set of electric price to actual income of the selected set of energy-consumption, obviously, the latter set economizes the fuel and reduces generated material consumption, so the actual income of the latter set is larger or equal to the former set's income (shown as FIG. 4).

In this example, if the electric price parameter is the control variable, set No. 3 is the benchmarking set, and sets No. 4 and No. 5 can not be selected because their electric price parameter are more than set No. 3 parameter. However, if the energy-consumption parameter is the control variable, set No. 3 is the stake line set, and sets No. 4 and No. 5 can not be selected because their energy-consumption parameter is more than set No. 3 parameter. If the $SO_2$ discharge parameter is the control variable, set No. 6 is the benchmarking set, and sets No. 1 and No. 2 cannot be selected because its $SO_2$ discharge parameter is more than set No. 6 parameter (shown as FIG. 4). After study the relationship among sets, it can be found that sets No. 2 and No. 3 are selected and have not displaced and been displaced in the electric price parameter sequence and energy-consuming parameter sequence. If the control target is energy-saving, sets No. 4 and No. 5 must displace sets No. 6 and No. 1, and have a displacement relationship. According to the law of nature that generating set consumes primary energy, the primary energy consumption that is consumed the by the displaced set and been displaced set provides economic compensation. Obviously, sets No. 6 and No. 1 are replaced in the electric price parameter sequence, and did not take place primary energy consumption, but for sets No. 4 and No. 5, the primary energy consumption is lower than set No. 3. Moreover, sets No. 6 and No. 1 are replaced because their energy-consumption parameters are higher than set No. 3. This is the energy-saving principle of the invention (shown as FIG. 4). The above-mentioned example shows that the problem of set displacement and control is whether the set participates final running and homologous primary energies to eliminate and compensate.

Comparing a preselected set sequence of energy-consumption (set No. 4-5-2-3-1-6) to a preselected set sequence of $SO_2$ discharge (set No. 4-5-3-6-1-2), sets No. 4, No. 5, and No. 3 already satisfy the minimum requirement of $SO_2$ discharge. If the control target is $SO_2$ minimum discharge, the final selected sets are No. 4-5-3-6, and the control target is realized.

However, in actual performance, sometimes quantitative comprehensive comparison with concrete social and economic benefits of energy-consuming and $SO_2$ discharge confirm concrete control target and homologous control behavior. In this example, if the considered Pay fee (or energy-saving) is more, the grid control center can select the set No. 2 and unselect set No. 6. This fact shows that this method provides the quantitative and visualized comprehensive technology support means for actual the control decisions of power grids. Also, it is necessary and reasonable that the final selected set carried out timely adjustments based on economic and technological comprehensive comparison through the man-machine interaction (operation decision-making) 460.

The newly-added social, economic, and energy-saving benefit of the two generating sets control methods can be contrasted and compared intuitively in table 1 and FIG. 4.

When the power grid in the example will run '1 hour, the grid control center utilizes this method and the traditional method (the electric price parameter) to control, and its newly-added social and energy-saving economic benefit (the reductive-calculation coefficient of the energy-consuming parameter and the electric price parameter is 500 Yuan/ton), as shown in table 3.

TABLE 3 comparison of control result after actualize each control method

| The control method | Selected set | Buy the electricity expenditure (Yuan) | The energy-consuming (ton) | $SO_2$ discharge (ton) |
|---|---|---|---|---|
| Tradition (electric price) | 6-1-2-3 | 363000 | 450 | 9 |
| Preselected (energy-consuming) | 4-5-2-3 | 342000 | 342 | 6.24 |
| This method (SO2 discharge) | 4-5-3-6 | 361500 | 381 | 5.88 |
| Controllable (comprehensive) | 4-5-3-1 | 355500 | 369 | 6.12 |

It is shown clearly that the expenditure of buying electricity is 36300 RMB which is the highest. In fact, the power plant 320 did not increase income. The expenditures of grid control centers became the energy-consuming and $SO_2$ discharge. The waste of the traditional method is very astonishing. So, the traditional method is not economic, energy saving, or an environment-protecting method.

The process of a real-time and concentrating control method of generating sets is described as follows.

In order to expound the technical feasibility of this method, the process of manual operation control and automatic generation control (AGC) are introduced separately.

The manual way is the most original and the lowest-grade method. The on-duty operator of the grid control center exits AGC, or switches to the "artificial" or "manual" position; generation-side set of AGC can set the UNAV (the set be off-line, can't use).

Even in this type of case, the grid-control operator on duty determines the control order of the set according to the given target after data processing, then directly sends the control signal to the operator on duty of each power plant 320 by telephone according to the set order, carrying on a load increase and decreasing power on and off. These operations do not have hypostatic dissimilarity with traditional operation. The power operator of power plants and grid control centers can master the technique of the method according to the above introduction:

If the operator of the grid control center chooses the minimum $SO_2$ discharge of power grid as the control target, the control order is sets No. 4-5-3-6-1-2, according to above ordering. Under this kind of circumstance:

1. The grid control center sends out power on signal toward set No. 4, and gradually adds the set's load to 300 MW according to the set's ramp rate. Set No. 4 is set base-loaded, and generation of power is set at 300 MW.

2. The grid control center sends out power on signal toward set No. 5, and gradually adds the set's load to 300 MW, according to the set's ramp rate. Set No. 5 is set base-loaded, and generation of power is set at 300 MW.

3. The grid control center sends out power on signal toward set No. 3, and gradually adds the set's load to 300 MW, according to the set's ramp rate. Set No. 3 is set base-loaded, and generation of power is set at 300 MW.

4. The grid control center sends out power on signal toward set No. 6, and gradually adds the set's load to 300 MW, according to the set ramp rate. The operator of the set carries on correlative operation and monitoring at the same time.

In actual operation, the load often fluctuates, the operator of set No. 6 increases or decreases the load by hand, so we can follow the load fluctuation within a narrow range.

When the power grid load is reduced, Set No. 6's load is firstly decreased to ensure that the total $SO_2$ discharge is at a minimum.

The above-mentioned operation can ensure adoption of an artificial operation method that the total $SO_2$ discharge is at a minimum by manual operation, and completes the control mission of this method!

The above-mentioned example only chose 6 sets, and adopts the original means to carry out a control. The purpose only simplifies the demonstration process, and proves the principle that this method is feasible.

For the modern large power system, the set amount is more than hundreds, making impossible the adoption of the artificial, hand driven way to make policy and carry out a control. In fact, the modern power system almost adopts EMS (energy management system) for generation control. The various particular problems can be solved through programming software in EMS. It is found from the above table data that various related operations, information processing manners, and the arithmetic in this method are similar to that of traditional treatment methods! In order to simplify operation, it is a wise move to choose the treatment method that is similar to that of existing arithmetic and control processes.

The collected parameters of set are sorted using programming software.

This treatment process can be very easily used in each kind of calculator procedure language (such C Language etc.).

For example, it adopts the simplest arithmetic that is "bubble sort." The basic thought of this kind of method is that the sorted element is vertical sorting "air bubbles" and the smaller element easy float upward because it is lighter. The "air bubble" sequence need be sorted several times in "bubble sort." So-called "a process" is that the sequence is checked one time from the bottom up, and always judged whether the sequence of adjacent elements is correct. If it is discovered that the sequence of adjacent elements is wrong, the "light" chemical element is underneath, and they exchange positions. Obviously, after handling one time, the "the lightest" element floated to the highest position; after handling two times, the "the second-lightest" element floated to the second-highest position. The element in the highest position is not checked because it is already "the lightest" element. Generally, when the $i^{th}$ processing, it is not needed to check the element which is above the $i^{th}$-highest position, because they already have the right order after handling i−1 times.

When the power grid is huge and the set's number (establish H sets) is more, to speed up data processing, the insertion method can be use. The thought behind this method is an element which is to be sorted by inserting the appropriate position each time and the sequence will still be ordered; until the finishing all the element inserted. For example, G(1,H) 0.30, 0.31, 0.32, 0.33, 0.34, 0.28, which are the out of order electric price parameter (without considering network loss, the offer of each set equals "the electric price") of sets in table 1, are sorted from small to large. Its process is:

[The initial keyword][0.30], 0.31, 0.32, 0.33, 0.34, 0.28,
J=2(0.31) [0.30, 0.31], 0.32, 0.33, 0.34, 0.28,
J=3(0.32) [0.30, 0.31, 0.32], 0.33, 0.34, 0.28,
J=4(0.33) [0.30, 0.31, 0.32, 0.33], 0.34, 0.28,
J=5(0.34) [0.30, 0.31, 0.32, 0.33, 0.34], 0.28,
J=6(0.28) [0.28, 0.30, 0.31, 0.32, 0.33, 0.34]

After the above-mentioned processes, the electric price parameters 341 of the set were sorted from small to large: 0.28, 0.30, 0.31, 0.32, 0.33, and 0.34. According to the original record of the offer, the set sequence can be known: 6-1-2-3-4-5.

N (1, H)400, 310, 350, 200, 280, 440, which are the out of order energy-consuming parameter of sets in table 1, are sorted from small to large. Its process is:

[The initial keyword][400], 310, 350, 200, 280, 440,
J=2(310) [310, 400], 350, 200, 280, 440,
J=3(350) [310, 350, 400], 200, 280, 440,
J=4(200) [200, 310, 350, 400], 280, 440,
J=5(280) [200, 280, 310, 350, 400], 440,
J=6(440) [200, 280, 310, 350, 400, 440]

After the above-mentioned processes, the energy-consuming parameters 342 of the sets were sorted from small to large: 200, 280, 310, 350, 400, and 440. According to the original record of the energy-consuming parameter, the set sequence can be known: 4-5-2-3-1-6.

P(1,H) 7.8, 8.2, 7.0, 0, 5.6, 7.0, which are the out of order $SO_2$ discharge parameters of sets in table 1, are sorted from small to large. After processed, the $SO_2$ discharge parameters 343 of the sets were sorted from small to large: 0, 5.6, 7.0, 7.0, 7.8, and 8.2. According to the original record of the $SO_2$ discharge parameter, the set sequence can be known: 4-5-3-6-1-2.

This is to say, according to the minimization of the $SO_2$ discharge, the set sequence is: 4-5-3-6-1-2.

The Concrete Operation of AGC:

The following is how to realize the control target which is the minimization of the $SO_2$ discharge with the sequence (4-5-3-6-1-2) by using AGC.

If using AGC (such as the foreign early production) to actualize this method, AGC need be changed to a related operation.

In general, the set has three running states:

UNAV—the set is off-line, and cannot be used. Set No. 1 and set No. 2 in this example are not need generated under normal conditions, so should be set at "UNAV."

PLT—the set is on-line, but do not participate in AGC control, directly control the region of the power plant. In this example, all sets use centralized control, so it is not allowed to be set at "PLT" (except set No. 1 and set No. 2).

AGC—set is on-line, and participates in the far-away AGC system control. In this example, all sets should be set at "AGC" (except set No. 1 and set No. 2).

When the set is power on and set at "AGC," the set is in the following several running modes under normal conditions:

STBY—the set is on-line, and changed to AGC mode; the set prepares to be controlled, but has not been set at "AG.C." In this example, sets No. 1 and No. 2 can be set at "STBY."

MBP—the set is running AGC according to a plan curve, but does not participate in ACE or economic regulation. In this example, 4, 5, 3 and 6 number sets should be set at "MBP," and the plan curve should be set to 300 MW.

MBPR—the set is running AGC according to plan curve, and participate ACE regulation, but do not participate in economic regulation. In this example, if considered the automatic frequency adjustment of the system, set No. 6 (the last one of the sequence) must be set at "MBPR." In this example, the power system has established a small independent system, and its load is not changed, so set No. 6 also does not need to be set at "MBPR."

AUTR—the set is an AGC set, and only participates in ACE regulation, but does not participate in economic regulation. The set in this example does not need to be set at "AUTR."

AUTE—the set is an AGC set, and does not participate in ACE regulation, and its running base value is computed by a sub-procedure of the economic control (ED), and only participates in economic regulation. The set in this example does not need to be set at "AUTE."

AUTO—the set is an AGC set, and participates in ACE regulation and economic regulation, and its running base value is computed by a sub-procedure of the economic control (ED). The set in this example does not need to be set at "AUTO."

TEST—the set is running an experimental response, and is controlled by the AGC procedure, but does not participate in ACE and EDC regulation. The set in this example cannot be set at "TEST."

According to above-mentioned important point of the operation, it is noticed that this example does not involve generational problems of power system, such as frequency modulation, voltage regulation, and tie line power control, etc. With a homologous setting in the AGC system, the power system can complete generator automatic control. In operation, the grid control center and power plant 320 of AGC system should be noticed. That is to say that the automatic system of the EMS/AGC is concerned with the boiler-turbine coordinated control system of plant stations.

The Points for Attention:

1, Generate Scheme setting (GS):

The base value plan of power plants (BSKED menu) in the AGC system GS is set for: set No. 4 is 300 MW; set No. 5 is 300 MW; set No. 3 is 300 MW; set No. 6 is 300 MW; set No. 1 is 0 MW; set No. 2 is 0 MW.

Deration plan (DERATES menu) is set for: 2-1-6-3-5-4.

Others plans are set at exit positions, such as fuel cost plan (FCOST), fuel usage plan (FSKED), reserve plan (RESERVE), trade plan (TRSKALL), etc.

2, Four modes of base power value following respectively make some settings:

(1) Economic Dispatch mode (Economic Dispatch, ED): 6 sets exit the ED function.

(2) Plan setting mode (BL): The setting of the base power value in 6 AGC sets is the same as the generation scheme (GS). Namely: set No. 4 is 300 MW, set No. 5 is 300 MW, set No. 3 is 300 MW, set No. 6 is 300 MW, set No. 1 is 0 MW, and set No. 2 is 0 MW.

(3) Economic output average mode (AV): exit.

(4) Manual input mode (BP):

Under this mode, all the base power values of the AGC set are set online by the operator of the grid control center.

3, The set regulation mold

Because without considering the frequency adjustment of the set in the example, all the functions of this mode can be exited, namely, are regulate at (O). In this example, the power system has 4 sets which are 300 MW, and the total load of the power system is 1200 MW. If the frequency adjustment of the set is consider, the related parameter of the AGC should be set. For example, the frequency characteristic parameter of the system is $P_f$ is 2.5 (all of the systems are not same). That is to say, the load will change 2.5% when the system frequency changes 1%.

4, PLC 490 control mode

This mode function calculates the difference between the actual output and the excepted output, and returns the difference to the AGC mode of the grid control center, after the AGC mode is calculated, it gives control orders to the power plant, and compensate deviation.

This example does not aim at control processes such as power grid frequency modulation and voltage regulation, etc, so the settings are not different between AGC and electric price parameter controls, except for the control order, the maximum (minimum) power, the load and vibration area of unit, etc. Every power grid operator and power plant 320 can master this method.

For example, if the set is controlled according to the comprehensive method in table 3, it only changes the control order of artificial control and AGC control: 4-5-3-1.

If domestic AGC is used, the operation of the grid control center and power plant 320 will be simpler:

Click "the AGC running control" on the main screen, get into AGC running monitoring screen, the left half screen shows some important running information, which is use to monitor and control.

The grid control center selects the operation between "run" and "stop" concerning AGC.

Run: clicking the "run" button, will show the "RUN" inside pane. Under this kind of work state, all the AGC functions can run normally and take closed-loop control.

STOP: clicking the "STOP" button will show the "STOP" inside pane. Under this kind of work state, AGC takes an open-loop control and does not send out the control signal to generator, but other functions can run normally and monitor all the work and data on the screen.

Under this kind of work state, the control target is the minimization of $SO_2$ discharge from the power grid, the set sequence is 4-5-3-6-1-2:

Some operation should be run in the grid control center:

The "base power valve" of sets No. 4, No. 5, and No. 3 is set: The SCHE of set No. 4=300 MW; The SCHE of set No. 5=300 MW; The SCHE of set No. 3=300 MW.

The power regulation mode of set No. 4, set No. 5, and set No. 3 are set: "OFF" or "EMG" (urgent).

The base power valve of set No. 6 is set: "AUTO," its power regulation mode is set: "REG" (regulate).

For assort with the AGC master station 470 of the grid control center, the power plant side of AGC in sets No. 4, No. 5, No. 3 and No. 6 is set at the "remote control" position; but sets No. 1 set No. 2 is set at the "local control" position.

If the control target is energy-saving and discharge-reduction, namely the "comprehensive" (controllable) method in table 3, the set sequence is changed to 4-5-3-1, and some operation should be run:

The "base power valve" of sets No. 4, No. 5, and No. 3 is set: The SCHE of set No. 4=300 MW; The SCHE of set No. 5=300 MW; The SCHE of set No. 3=300 MW.

The power regulation mode of sets No. 4, No. 5, and No. 3 is set: "OFF" or "EMG" (urgent).

The base power valve of set No. 1 is set: "AUTO," its power regulation mode is set: "REG" (regulate).

For assort with the AGC master station 470 of the grid control center, the power plant side of AGC in sets No. 4, No. 5, No. 3, and No. 1 are set at the "remote control" position; but sets No. 6 and No. 2 are set at "local control" position.

The target of the traditional control is minimization of payment, namely "traditional" (electric price), and cannot consider energy-saving and discharge-reduction, the set sequence is change to 6-1-2-3, and some operations should be run:

The "base power valve" of sets No. 6, No. 1, and No. 2 is set: The SCHE of set No. 4=300 MW; The SCHE of set No. 5=300 MW; The SCHE of set No. 3=300 MW.

The power regulation mode of sets No. 6, No. 1, and No. 2 is set: "OFF" or "EMG" (urgent).

The base power valve of set No. 3 is set: "AUTO", its power regulation mode is set: "REG" (regulate).

For assort with the AGC master station 470 of the grid control center, the power plant side of AGC in sets No. 6, No. 1, No. 2, and No. 3 is set at the "remote control" position; but sets No. 4 and No. 5 are set at the "local control" position.

In this example, it is should pointed out that the 6 sets have the same capacity, and its purpose is easy to introduce. But in actual operation, this kind of circumstance is hard to duplicate. As long as the related parameter of each set corresponds and does not mix, this kind of method is very easy to realize under conditions of the current power grid and power plant.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

The invention claimed is:

1. A control method for generating data sets for reduction of sulfur dioxide in energy grid, comprising the following steps:
   1) inputting each generating set of electric price parameters, energy-consumption parameters, and $SO_2$ discharge parameters into a grid control center through a communication network;
   2) identifying, confirming and saving the received electric price parameters, energy-consumption parameters, and $SO_2$ discharge parameters into a database, then sorting the electric price parameters, energy-consumption parameters, and $SO_2$ discharge parameters separately from small to large at their own sorting cycles;
   3) determining an electric price stake line, an energy-consuming stake line and a $SO_2$ discharge stake line for the electric price parameters, the energy-consuming parameters and the $SO_2$ discharge parameters respectively; comparing the energy-consuming parameters with the energy-consuming stake line and obtaining generating sets selected according to the energy-consuming; comparing the electric price parameters with the electric price stake line, and obtaining generating sets selected according to the electric price; comparing the $SO_2$ discharge parameters with the $SO_2$ discharge stake line, and obtaining generating sets selected according to the $SO_2$ discharge;
   4) inputting information of the generating sets selected according to the energy-consuming and the generating sets selected according to the electric price in 3) into a electric price and energy-consumption preselection computer; carrying out preselection calculation according to the electric price and energy-consuming parameters; outputting the generating sets selected according to the energy-consuming, and economic consideration data of energy-consuming replacement of the generating sets according to the energy-consuming stake line;
   5) inputting information of the generating sets obtained in 4) and the generating sets selected according to the $SO_2$ discharge in 3) into a host computer system for comprehensive analysis of the electric price, energy-consuming and environmental protection, and obtaining final generating sets; and
   6) adopting a direct manual operation to control the final generating sets; or sending control signal of the final generating sets from the host computer system to an automatic generation control master station; outputting the control signal from the automatic generation control master station to automatic generation control systems of generating companies through a private data network of power grid, and realizing automatic generation control of the generating sets.

2. The method of claim 1, wherein said energy-consumption parameters and $SO_2$ discharge parameters are decided by the physical and chemical properties of the fuel, running environment, and conditions of the set, and measured by chemical experiment and monitors.

3. The method of claim 1, wherein said economic consideration data of energy-consuming replacement of the generating sets is calculated according to power on, power off, and homologous fuel consumption.

4. The method of claim 1, wherein said automatic generation control master station dictates the automatic generation control of the generating sets, and the process is: the automatic generation control master station respectively controls and links controller of each set, or the automic generation control master station of the grid control center sends out a signal to the controller of each generating set through a private data network of power grids, and the signal of the set controller is assigned to a digital/analog converter and converted to analog, then the analog is sent to the boiler-turbine coordinated control system, and the grid control center realizes the automatic generation control of the generating set.

5. The method of claim 1, wherein the electric price stake line is determined by the process of searching the generating sets one-by-one according to the electric price parameters; the electric price parameter of the last generating set is the electric price stake line when the total output of the generating sets is equal to the power grid load.

6. The method of claim 1, wherein the energy-consuming stake line is determined by the process of searching the generating sets one-by-one according to the energy-consuming parameters; the energy-consuming parameter of the last generating set is the energy-consuming stake line when the total output of the generating sets is equal to the power grid load.

7. The method of claim 1, wherein the $SO_2$ discharge stake line is determined by the process of searching the generating sets one-by-one according to the $SO_2$ discharge parameters; the $SO_2$ discharge parameter of the last generating set is the $SO_2$ discharge stake line when the total output of the generating sets is equal to the power grid load.

* * * * *